(12) United States Patent
Lin

(10) Patent No.: US 9,211,029 B2
(45) Date of Patent: Dec. 15, 2015

(54) ELECTRIC GRILL PAN DEVICE WITH A SEPARATE POWER CONNECTION

(71) Applicant: Yu-Yuan Lin, Tainan (TW)

(72) Inventor: Yu-Yuan Lin, Tainan (TW)

(73) Assignee: UNI-SPLENDER CORP., Tainan (TW)

( * ) Notice: Subject to any disclaimer, the term of this patent is extended or adjusted under 35 U.S.C. 154(b) by 450 days.

(21) Appl. No.: 13/726,587

(22) Filed: Dec. 25, 2012

(65) Prior Publication Data
US 2014/0175086 A1 Jun. 26, 2014

(51) Int. Cl.
*F27B 14/00* (2006.01)
*F27D 11/00* (2006.01)
*A47J 27/00* (2006.01)
*A47J 37/06* (2006.01)

(52) U.S. Cl.
CPC ............ *A47J 27/004* (2013.01); *A47J 37/0676* (2013.01)

(58) Field of Classification Search
CPC ..... A47J 37/0676; A47J 37/0611; H05B 3/68
USPC .......................... 219/450.1, 541; 99/378, 379
See application file for complete search history.

(56) References Cited

U.S. PATENT DOCUMENTS 3,172,999 A * 3/1965 Sutton et al. .................. 219/524
6,472,644 B1 * 10/2002 Wu ............................. 219/450.1

* cited by examiner

*Primary Examiner* — Tu B Hoang
*Assistant Examiner* — Thomas Ward

(57) ABSTRACT

An electric grill pan device includes a heating pan detachably mounted above a base. A socket is mounted in the base and includes a seat and an upper cover. A compartment is defined between the upper cover and the seat. The upper cover includes a plurality of insertion holes aligned with terminals on the seat. The upper cover further includes a notch aligned with an abutment peg on the heating pan. A shield is pivotably mounted in the compartment and includes a guiding portion aligned with the abutment peg. The shield is biased to a position covering the insertion holes. When the heating pan is mounted to the base, the abutment peg presses against the guiding portion and pivots the shield to another position not covering the insertion holes, and conductive ends of a heating element on the heating pan is in electrical contact with the terminals.

3 Claims, 12 Drawing Sheets

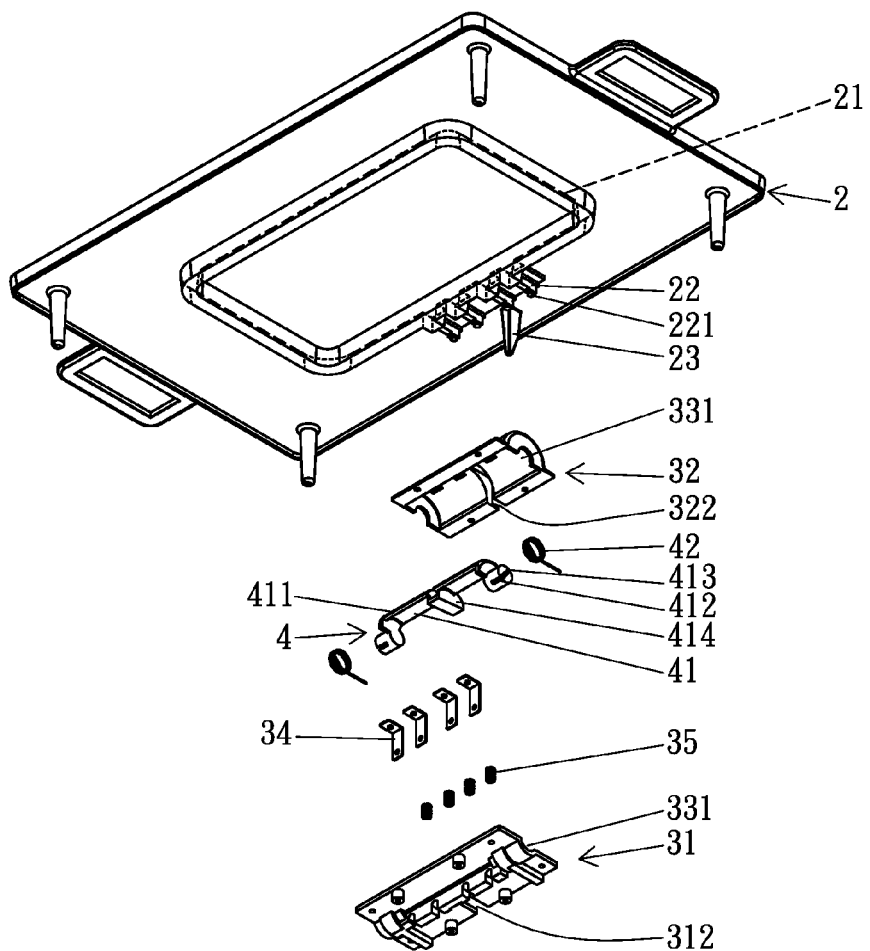
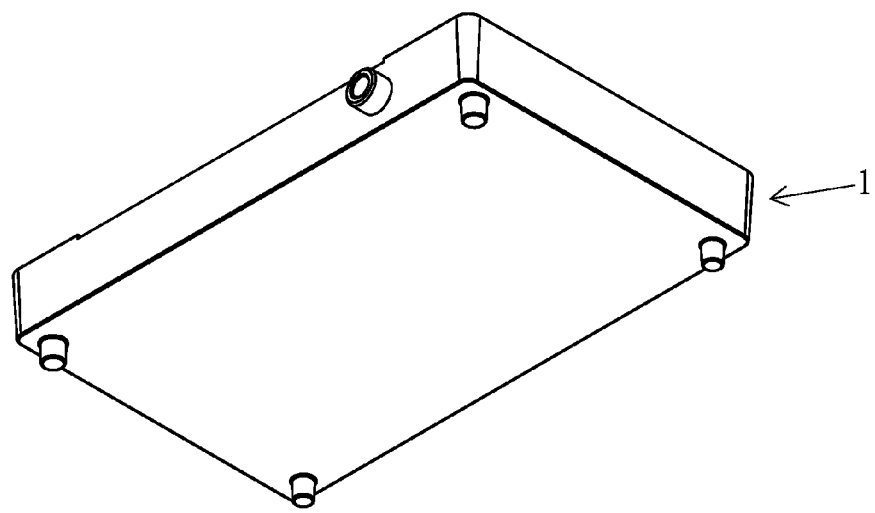
FIG.2

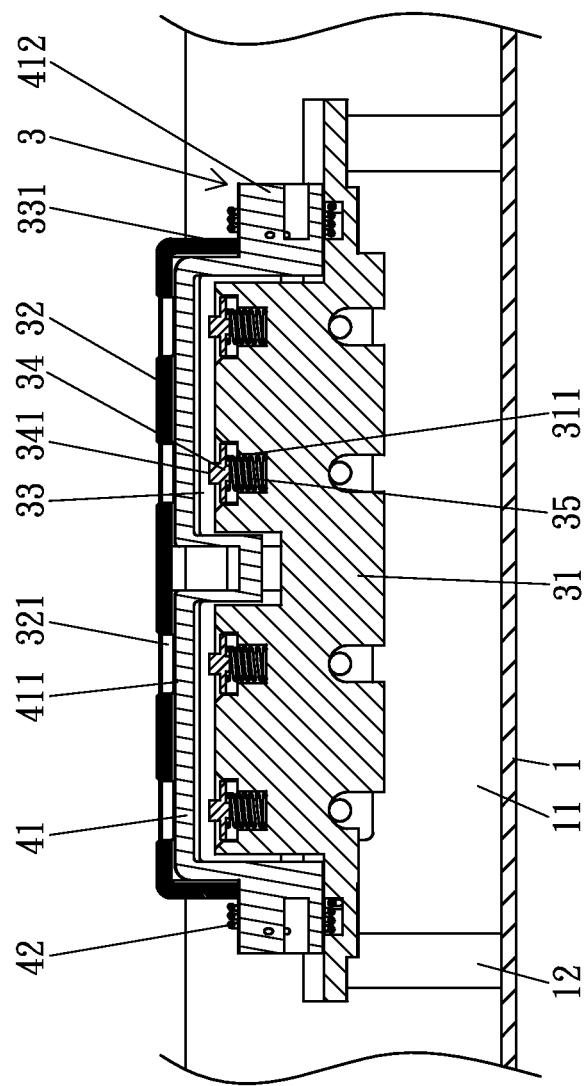

B-B

ELECTRIC GRILL PAN DEVICE WITH A SEPARATE POWER CONNECTION

BACKGROUND OF THE INVENTION

The present invention relates to an electric grill pan device with a separate power connection structure and, more particularly, to an electric grill pan device with enhanced power connection protection and reliable power connection.

An electric grill pan device generally includes a base, a heating pan detachably mounted to the base, and an electric heating element that heats the heating pan for barbecuing food in the heating pan. A socket is mounted on the base for connection with an external power source. When the heating pan is mounted to the base, terminals of the socket come in contact with conductive ends of the heating element for barbecuing food. The heating pan can be detached from the base for cleaning purposes. However, the terminals of the socket are exposed when the heating pan is detached from the base, causing risks of electric shock to the user. Furthermore, ambient water and dust will cause rusting of the surfaces of the terminals of the socket and poor conduction while resulting in high temperature at the electrical connection area.

U.S. Pat. No. 7,002,108 discloses an electric frying apparatus including an outer pot body, an inner pot body, and a socket. The socket includes a housing having two insertion holes. A movable member is mounted in the housing and has a guide block. An elastic biasing member is attached to an end of the movable member. The movable member further includes two slots each receiving an electric contact. The slots of the socket are not aligned with the insertion holes of the housing before conductive terminals of two electric heating members of the inner pot body are inserted into the socket, avoiding the hands of the user or alien objects from contacting with the conductive terminals. A push lever on the inner pot body presses against the guide block on the movable member when the inner pot body is mounted into the outer pot body, causing the movable member to move in a lateral direction such that the slots of the socket are aligned with the insertion holes of the housing. The conductive terminals of the heating members of the inner pot body are inserted into the slots and electrically connected to the electric contacts in the socket.

Although such a mechanism avoids the hands of the user and alien objects from contacting with the conductive terminals, movement of the whole movable member is unstable. Furthermore, the connection area between the movable member and the conductive terminals of the heating members and the electric contacts of the socket is liable to deform due to heat, such that the lateral movement of the movable member in the housing is more unstable. Further, the elastic biasing member may deform due to the heat, failing to provide reliable operation. Further, although the elastic biasing member is used to assure tight contact between the conductive terminals of the heating members and the electric contacts of the socket, the direction of the biasing force provided by the elastic biasing member is different from the insertion direction of the conductive terminals of the electric heating member, reliable plane connection between the conductive terminals of the heating members and the electric contacts of the socket can not be guaranteed while leading to unsatisfactory heat conducting efficiency and a temperature increase at the connection area.

BRIEF SUMMARY OF THE INVENTION

An objective of the present invention is to provide an electric grill pan device with enhanced power connection protection and reliable power connection.

The electric grill pan device includes a base having a space. A heating pan is detachably mounted above the base. A heating element is mounted to a bottom side of the heating pan and includes a plurality of conductive ends. Each of the plurality of conductive ends has a first contact surface. An abutment peg is formed on the bottom side of the heating pan. A socket is mounted in the space of the base. The socket includes a seat, an upper cover, and a plurality of terminals. A compartment is defined between the upper cover and the seat. Each of the plurality of terminals is located on the seat and has a second contact surface. The plurality of terminals is adapted to be connected to an external power source. The upper cover includes a plurality of insertion holes aligned with the plurality of terminals. The upper cover further includes a notch aligned with the abutment peg. A shield mechanism includes a shield and at least one elastic element. The shield is pivotably mounted in the compartment of the socket about a pivot axis. The shield includes a shielding portion and a guiding portion. The guiding portion is aligned with the abutment peg. The at least one elastic element biases the shield to a position in which the shielding portion covers the insertion holes of the upper cover.

When the heating pan is mounted to the base, the abutment peg presses against the guiding portion and pivots the shield to another position in which the shielding portion does not cover the insertion holes of the upper cover, and the first contact surface of each of the plurality of conductive ends of the heating element is in electrical contact with the second contact surface of one of the plurality of terminals.

In the form shown, the socket includes two axle holes on two sides of the compartment. Two axles are formed on two ends of the shield. The two axles are pivotably received in the axle holes of the socket. The at least one elastic element includes two torsion springs respectively mounted around the two axles. Each torsion spring has two ends attached to the seat of the socket and one of the axles of the shield.

In the form shown, the seat includes a plurality of receptacles, with each of the plurality of receptacles extending in a vertical direction. A terminal spring is received in each of the plurality of receptacles. Each terminal spring is mounted below one of the plurality of terminals. The terminal springs bias the plurality of terminals towards the plurality of conductive ends in the vertical direction.

In the form shown, the upper cover of the socket includes semi-circular cross sections perpendicular to the pivot axis of the shield.

The present invention will become clearer in light of the following detailed description of illustrative embodiments of this invention described in connection with the drawings.

DESCRIPTION OF THE DRAWINGS

FIG. 2 shows another exploded, perspective view of the electric grill pan device according to the present invention.

FIG. 4 is a cross sectional view taken along section line A-A of FIG. 3.

DETAILED DESCRIPTION OF THE INVENTION

Figure 1:
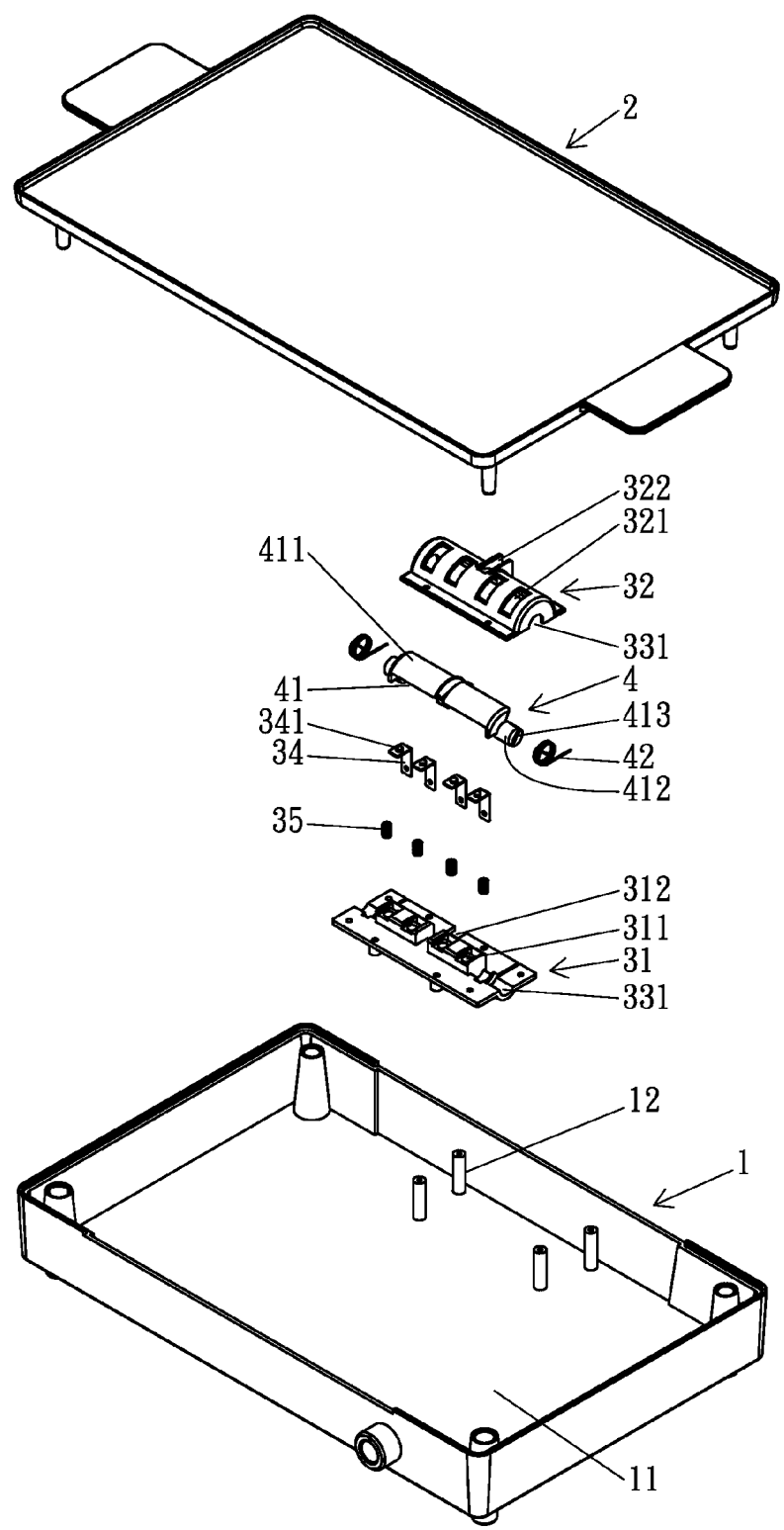
FIG. 1 shows an exploded, perspective view of an electric grill pan device of an embodiment according to the present invention.
Figure 3:
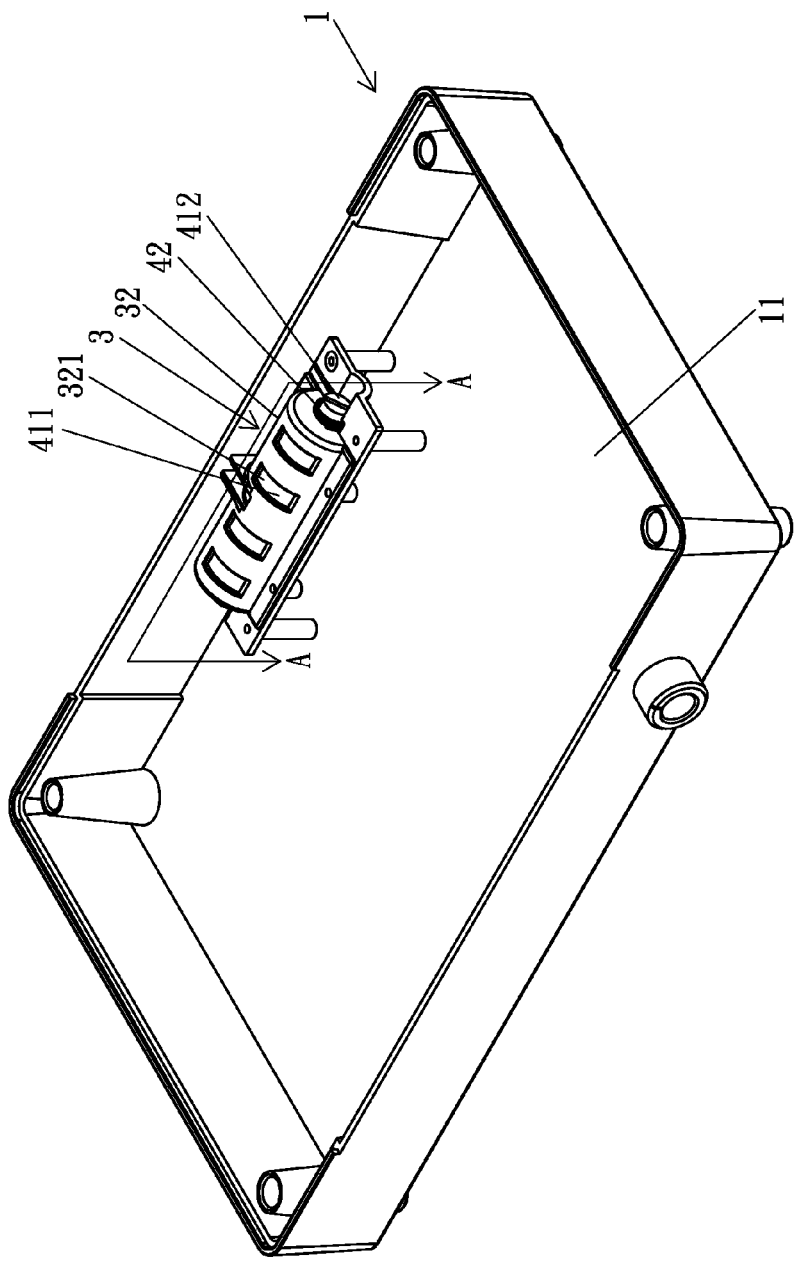
FIG. 3 shows a perspective view of a base and a socket of the electric grill pan device after assembly.

With reference to FIGS. 1-4, an electric grill pan device according to the present invention includes a base 1, a heating pan 2, a socket 3, and a shield mechanism 4. The base 1 includes a space 11 in which a plurality of pegs 12 is provided.

The heating pan 2 is detachably mounted above the base 1. Two heating elements 21 are mounted to a bottom side of the heating pan 2 and include a plurality of conductive ends 22, with each conductive end 22 having a first contact surface 221. An abutment peg 23 is formed on the bottom side of the heating pan 2.

The socket 3 is mounted in the space 11 of the base 1. The socket 3 includes a seat 31, an upper cover 32, and a plurality of terminals 34. The upper cover 32 covers the seat 31, with a compartment 33 defined between the upper cover 32 and the seat 31. The socket 3 further includes two axle holes 331 on two sides of the compartment 33. Each terminal 34 is located on the seat 31 and has a second contact surface 341. The terminals 34 are adapted to be connected to an external power source. The upper cover 32 includes a plurality of insertion holes 321 aligned with the terminals 34. The upper cover 32 further includes a notch 322 aligned with the abutment peg 23. The seat 31 includes a plurality of receptacles 311, with each receptacle 311 extending in a vertical direction. A terminal spring 35 is received in each receptacle 311. Each terminal spring 35 is mounted below one of the terminals 34 and biases the terminal 34 towards a corresponding conductive end 22 in the vertical direction.

The shield mechanism 4 includes a shield 41 and at least one elastic element 42. The shield 41 is pivotably mounted in the compartment 33 of the socket 3 about a pivot axis. In the form shown, the shield mechanism 4 includes two elastic elements 42. The shield 41 includes a shielding portion 411. Two axles 412 are formed on two ends of the shield 41 and pivotably received in the axle holes 331 of the socket 3. Each axle 412 has a spring attachment portion 413. The shield 41 further includes a guiding portion 414 extending from an edge thereof and aligned with the notch 322 of the upper cover 32, which, in turn, is aligned with the abutment peg 23. Each elastic element 42 is in the form of a torsion spring around one of the axles 412. Each torsion spring has two ends attached to the seat 31 of the socket 3 and the spring attachment portion 413 of one of the axles 412 of the shield 41. The elastic elements 42 bias the shield 41 to a position in which the shielding portion 411 covers the insertion holes 321 of the upper cover 32. When the guiding portion 414 is pressed by the abutment peg 23, the shield 41 pivots to another position in which the shielding portion 411 does not cover the insertion holes 321 of the upper cover 32. The upper cover 32 includes semi-circular cross sections perpendicular to the pivot axis of the shield 41 to reduce the spacing between the shielding portion 411 and the insertion holes 321 while reducing the volume of the upper cover 32.

Figure 5A:
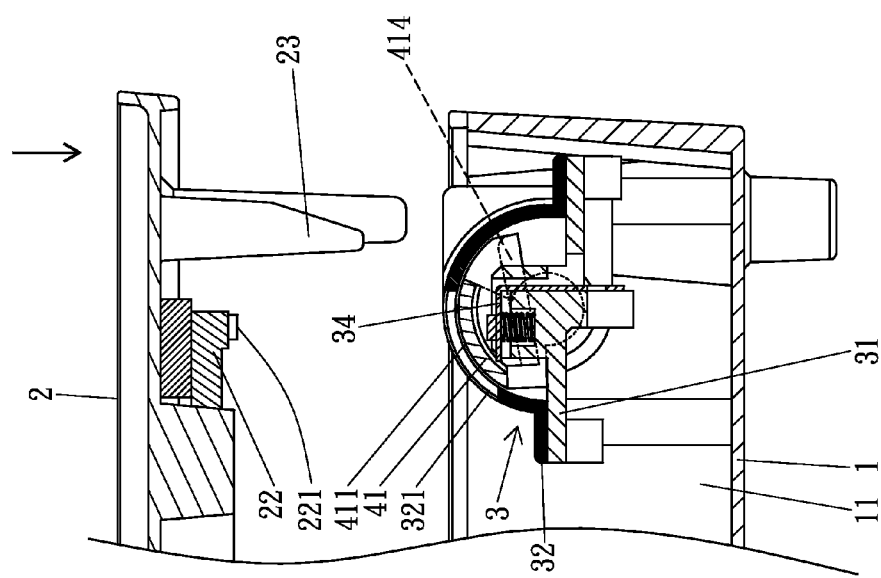
FIG. 5A-5C are partial, cross sectional views illustrating mounting of a heating pan to the base.
Figure 5B:
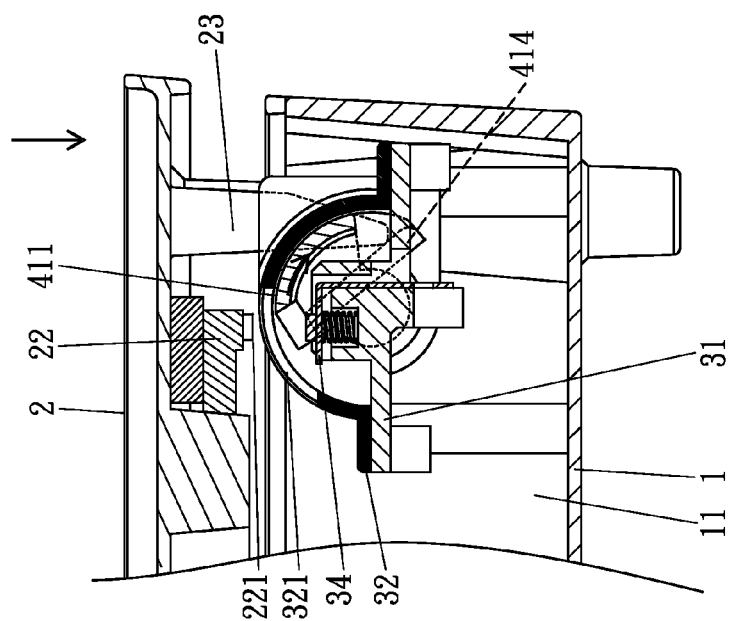
Figure 5C:
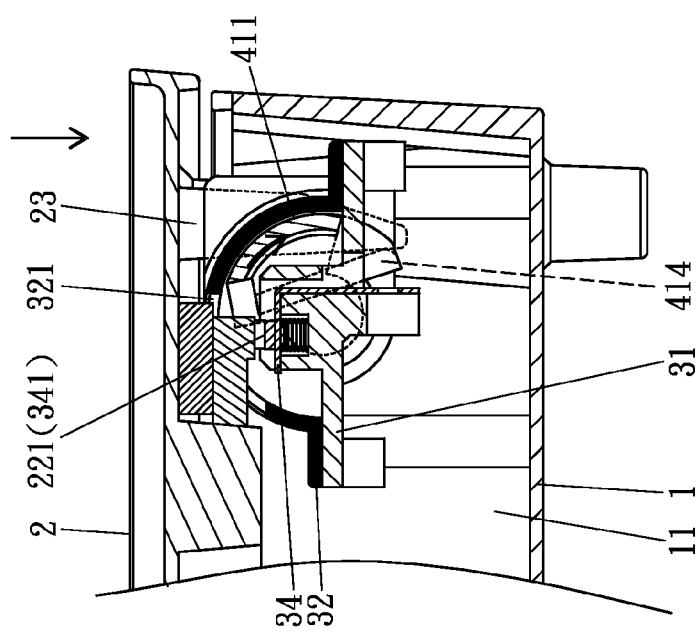
Figure 6:
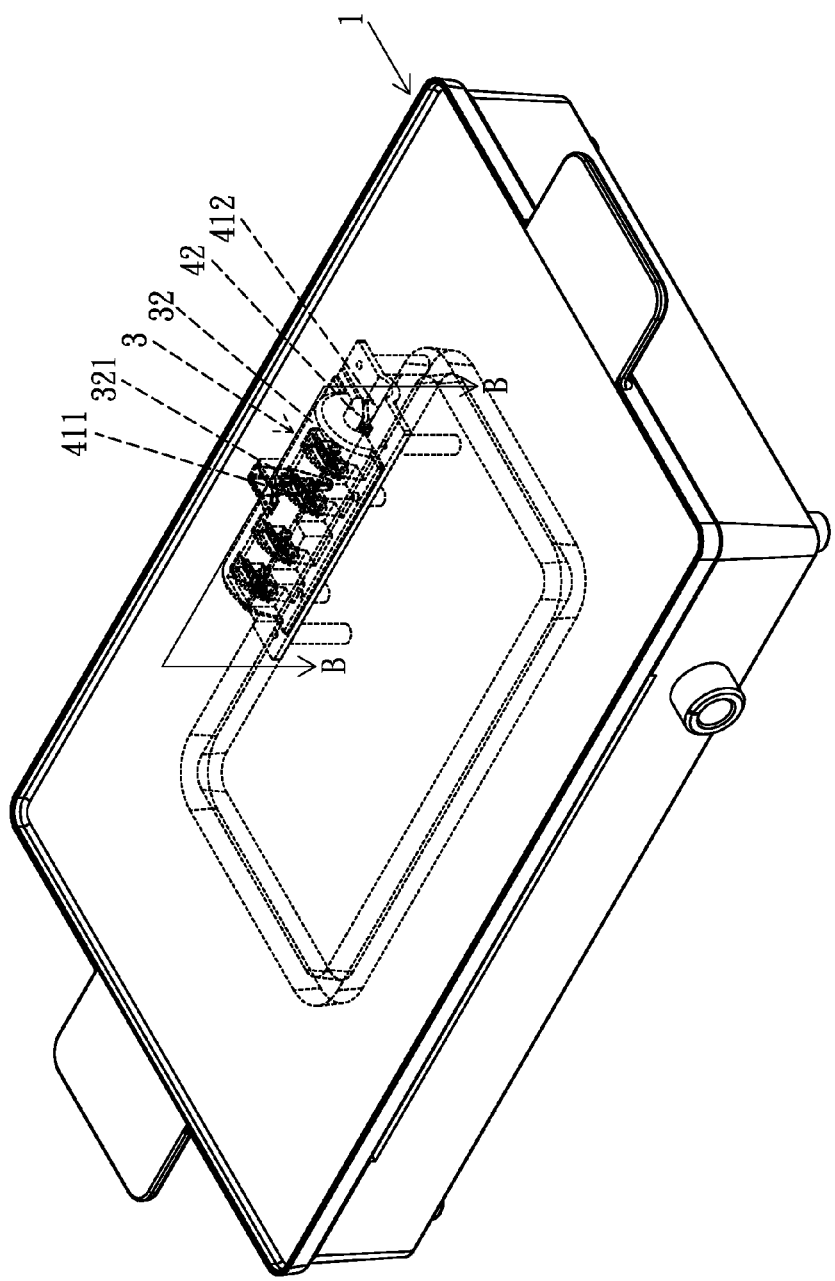
FIG. 6 is a perspective view of the electric grill pan device.
Figure 7:
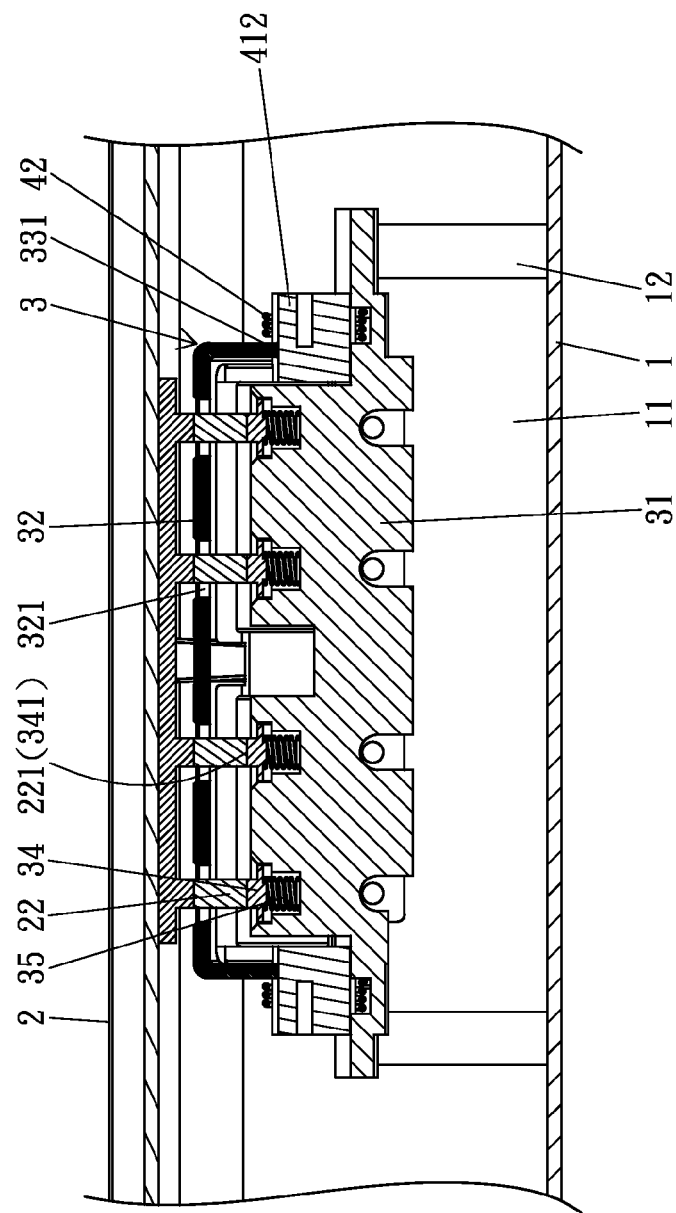
FIG. 7 is a cross sectional view taken along section line B-B of FIG. 6.
Figure 8:
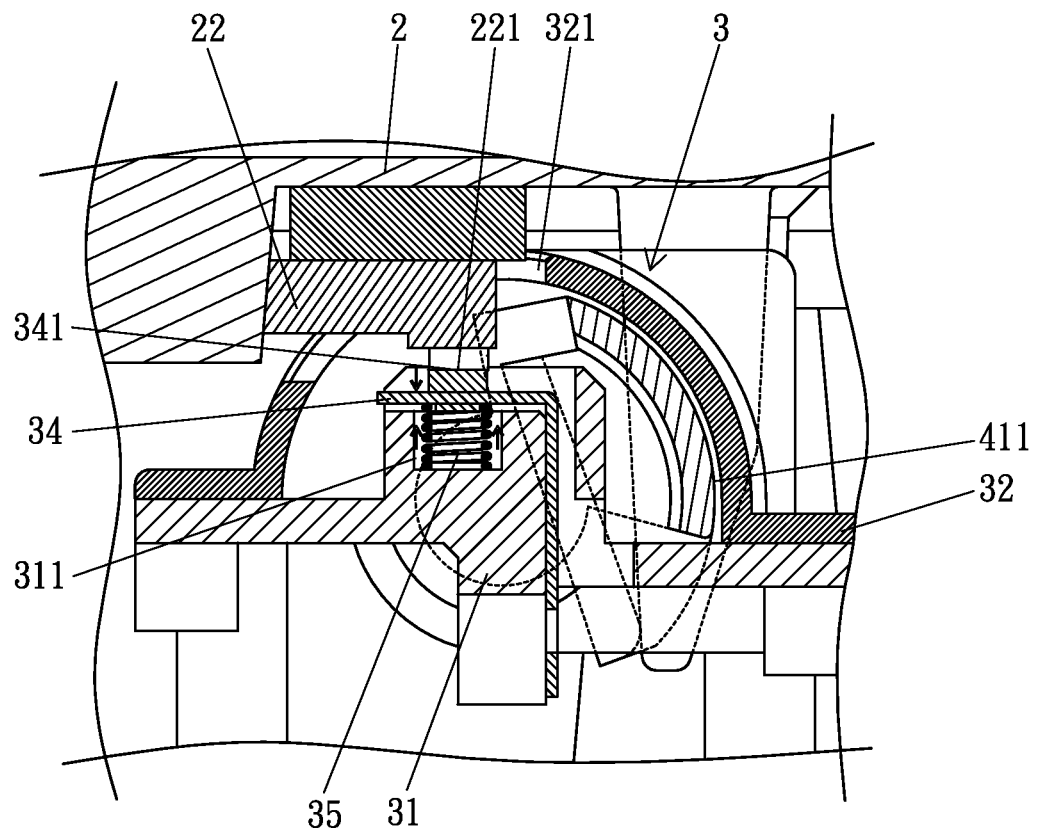
FIG. 8 is a partial, cross sectional view illustrating connection between a first contact surface of a conductive end of a heating element and a second contact surface of a terminal of the socket.

When the heating pan 2 is detached from the base 1, the shielding portion 411 of the shield 41 is in the position covering the insertion holes 321 of the upper cover 32 under the biasing force of the elastic elements 42, avoiding hands of a user or alien objects from contacting with the terminals 34. With reference to FIGS. 5A to 5C, when the heating pan 2 is mounted to the base 1, the abutment peg 23 presses against the guiding portion 414 and pivots the shield 41 to the other position in which the shielding portion 411 does not cover the insertion holes 321 of the upper cover 32, and the first contact surface 221 of each conductive end 22 is in electrical contact with the second contact surface 341 of one of the terminals 34. With reference to FIG. 8, the contact direction between the first and second contact surfaces 221 and 341 is coincident with the biasing direction of the terminal springs 35. This increases the contact pressure between the first and second contact surfaces 221 and 341, obtaining excellent conduction efficiency while reducing the temperature at the first and second contact surfaces 221 and 341.

The axles 412 at two ends of the shield 41 provide support for reliable pivotal movement of the shield 41, which is more reliable than the lateral movement of the movable member in U.S. Pat. No. 7,002,108. Furthermore, the shield 41 does not contact with the terminals 34, avoiding deformation of the shield 41 resulting from the temperature of the terminals 34 during operation. Further, the axles 412 and the elastic elements 42 are outside of the socket 3, avoiding deformation of the axles 412 and the elastic elements 42 due to the heat, assuring long-term operation while providing reliable operation and enhanced safety.

Figure 9:
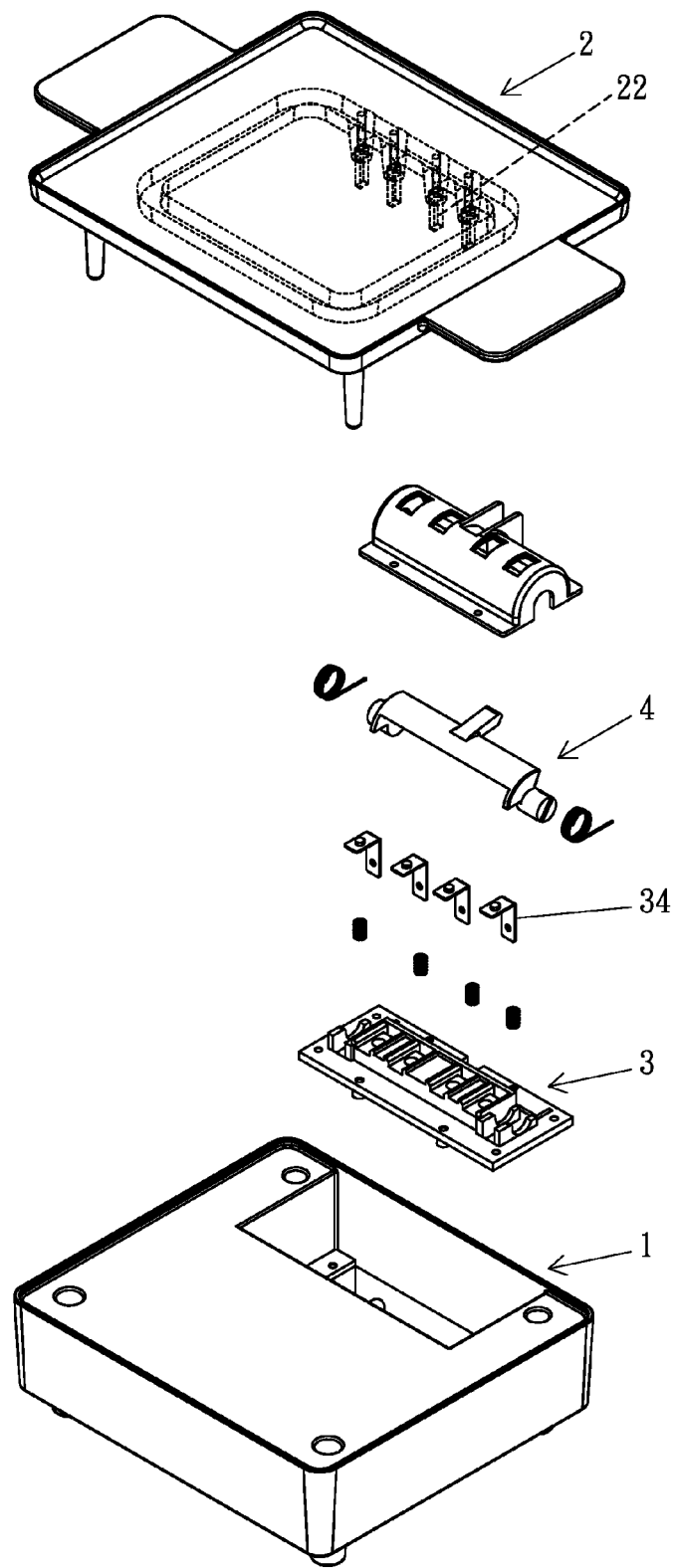
FIG. 9 is an exploded, perspective view of an electric grill pan device of another embodiment according to the present invention.
Figure 10:
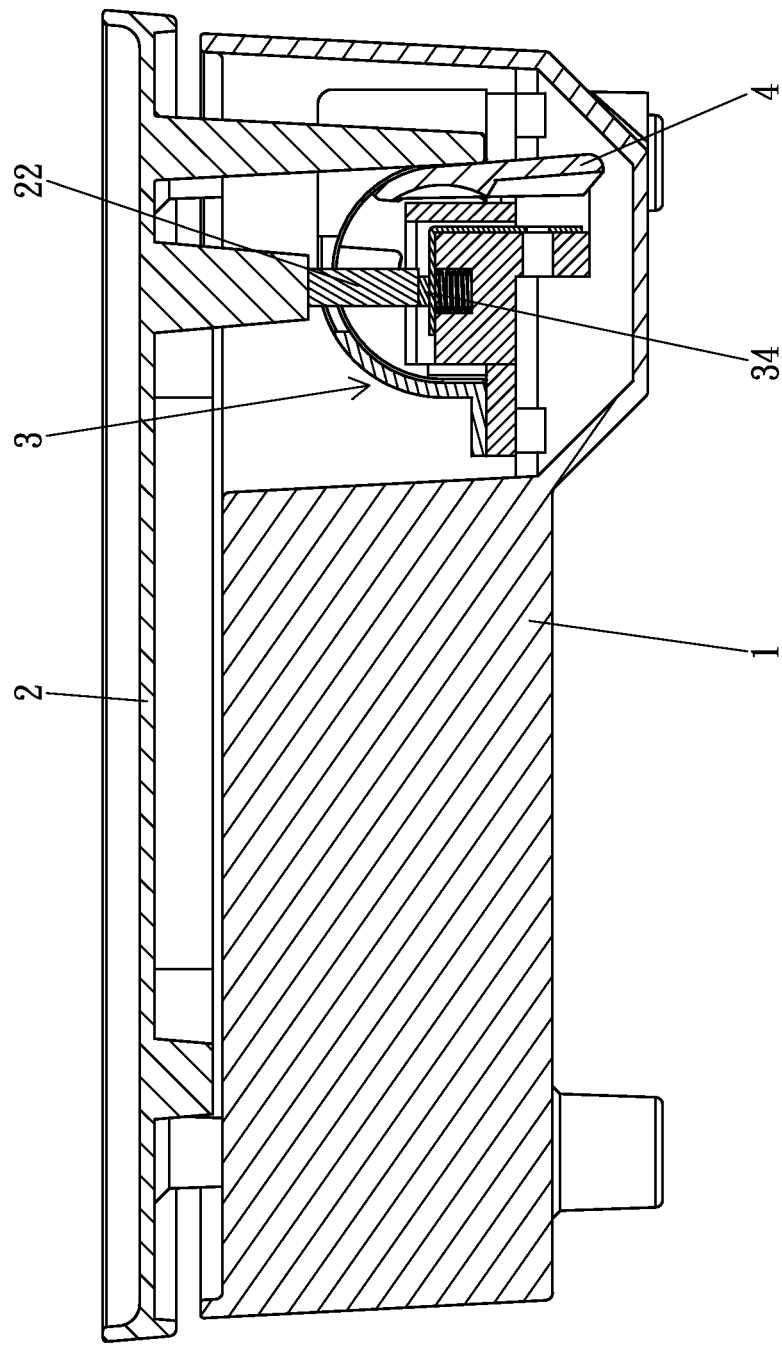
FIG. 10 is a partial, cross sectional view of the electric grill pan device of FIG. 9.

FIGS. 9 and 10 show another embodiment of the present invention, wherein the shapes of the base 1 and the heating pan 2 are different, and the conductive ends 22 of the heating elements 21 are cylindrical. The embodiments shown in FIGS. 1-8 include two heating elements 21, four conductive ends 22, and four terminals 34. However, the electric grill panel device can include one heating element 21, two conductive ends 22, and two terminals 34. Alternatively, the electric grill pan device can include more than two heating elements 21 and a corresponding number of conductive ends 22 and terminals 34.

Although specific embodiments have been illustrated and described, numerous modifications and variations are still possible without departing from the essence of the invention. The scope of the invention is limited by the accompanying claims.

The invention claimed is:

1. An electric grill pan device comprising: a base including a space; a heating pan detachably mounted above the base, with the heating pan including a bottom side, with a heating element mounted to the bottom side of the heating pan and including a plurality of conductive ends, with each of the plurality of conductive ends having a first contact surface, with an abutment peg formed on the bottom side of the heating pan; a socket mounted in the space of the base, with the socket including a seat, an upper cover, and a plurality of terminals, with a compartment defined between the upper cover and the seat, with each of the plurality of terminals located on the base and having a second contact surface, with the plurality of terminals adapted to be connected to an external power source, with the upper cover including a plurality of insertion holes aligned with the plurality of terminals, with the upper cover further including a notch aligned with the abutment peg; a shield mechanism including a shield and at least one elastic element, with the shield pivotably mounted in the compartment of the socket about a pivot axis, with the shield including a shielding portion and a guiding portion, with the guiding portion aligned with the abutment peg, with the at least one elastic element biasing the shield to a position in which the shielding portion covers the insertion holes of the upper cover, wherein when the heating pan is mounted to the base, the abutment peg presses against the guiding portion and pivots the shield to another position in which the shielding portion does not cover the insertion holes of the upper cover, and the first contact surface of each of the plurality of conductive ends of the heating element is in electrical contact with the second contact surface of one of the plurality of terminals, with the socket includes two axle holes on two sides of the compartment, with two axles formed on two ends of the shield, with the two axles pivotably received in the two axle holes of the socket, with the at least one elastic element including two torsion springs respectively mounted around the two axles, with each of the two torsion springs having two ends attached to the seat of the socket and one of the two axles of the shield.

2. An electric grill pan device comprising: a base including a space; a heating pan detachably mounted above the base, with the heating pan including a bottom side, with a heating element mounted to the bottom side of the heating pan and including a plurality of conductive ends, with each of the plurality of conductive ends having a first contact surface, with an abutment peg formed on the bottom side of the heating pan; a socket mounted in the space of the base, with the socket including a seat, an upper cover, and a plurality of terminals, with a compartment defined between the upper cover and the seat, with each of the plurality of terminals located on the base and having a second contact surface, with the plurality of terminals adapted to be connected to an external power source, with the upper cover including a plurality of insertion holes aligned with the plurality of terminals, with the upper cover further including a notch aligned with the abutment peg; a shield mechanism including a shield and at least one elastic element, with the shield pivotably mounted in the compartment of the socket about a pivot axis, with the shield including a shielding portion and a guiding portion, with the guiding portion aligned with the abutment peg, with the at least one elastic element biasing the shield to a position in which the shielding portion covers the insertion holes of the upper cover, wherein when the heating pan is mounted to the base, the abutment peg presses against the guiding portion and pivots the shield to another position in which the shielding portion does not cover the insertion holes of the upper cover, and the first contact surface of each of the plurality of conductive ends of the heating element is in electrical contact with the second contact surface of one of the plurality of terminals, with the seat including a plurality of receptacles, with each of the plurality of receptacles extending in a vertical direction, with a terminal spring received in each of the plurality of receptacles, with each terminal spring mounted below one of the plurality of terminals, with the terminal springs biasing the plurality of terminals towards the plurality of conductive ends in the vertical direction.

3. The electric grill pan device as claimed in claim 2, the upper cover of the socket including semi-circular cross sections perpendicular to the pivot axis of the shield.

* * * * *